April 8, 1924.
T. MORRISON ET AL
LOCK STEERING WHEEL
Filed April 27, 1923
1,489,359
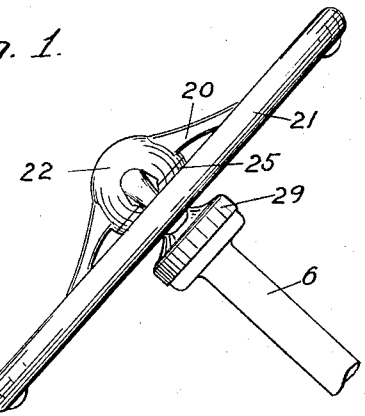
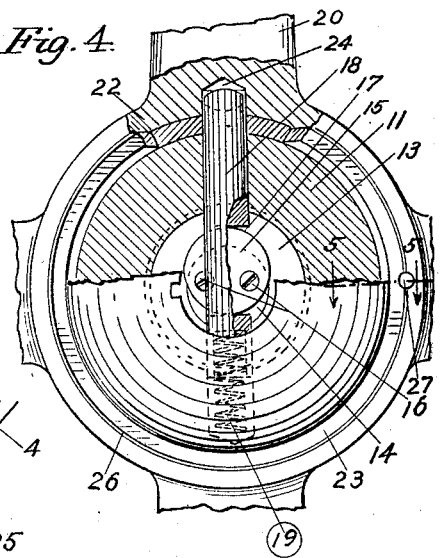
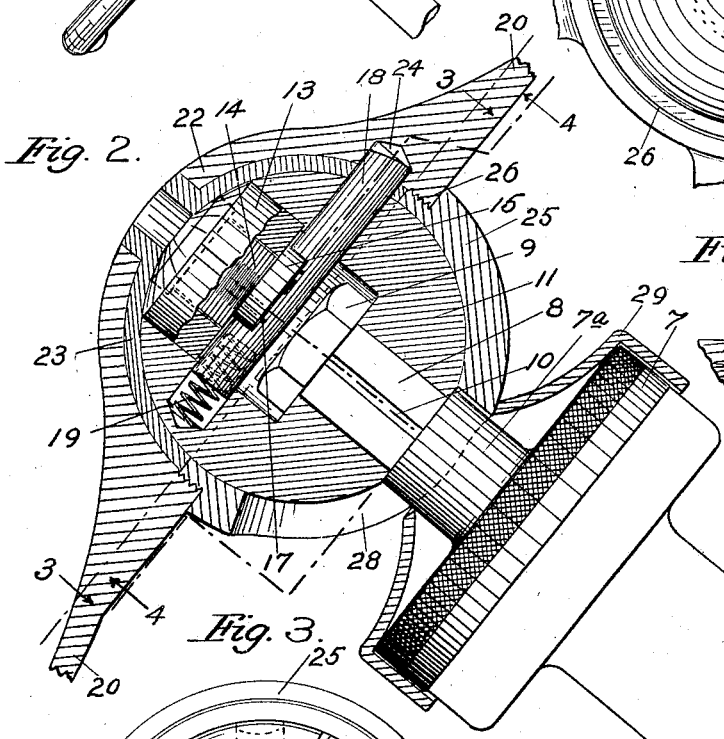
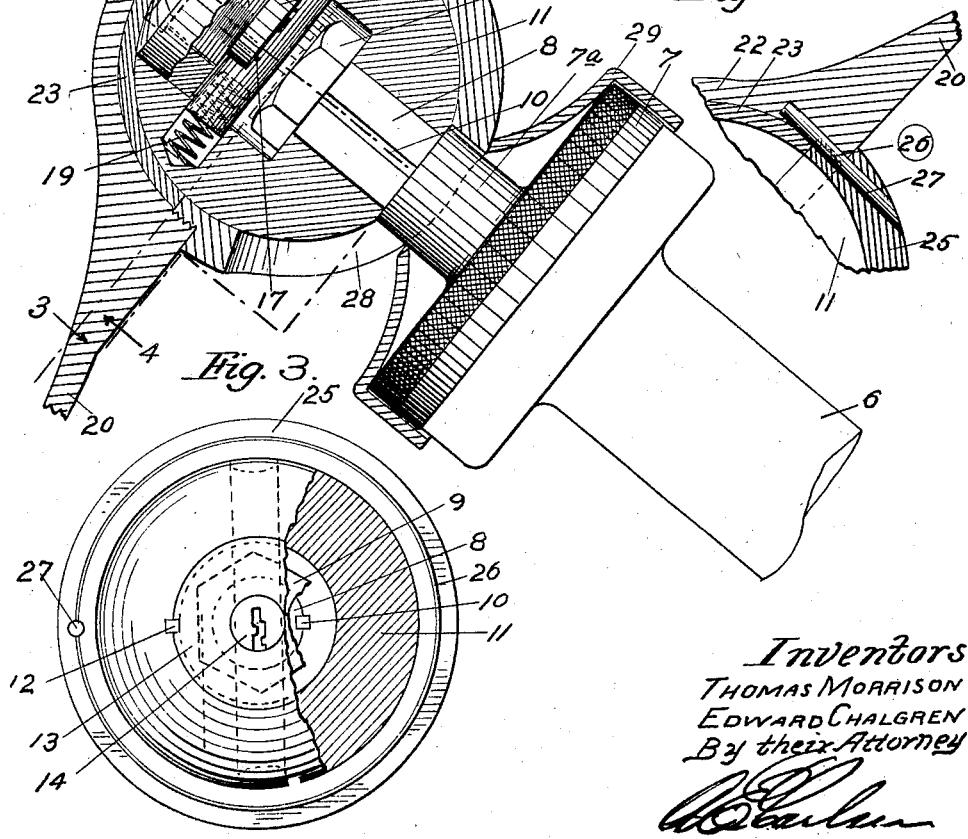
Inventors
Thomas Morrison
Edward Chalgren
By their Attorney Patented Apr. 8, 1924.

1,489,359

UNITED STATES PATENT OFFICE.

THOMAS MORRISON AND EDWARD CHALGREN, OF MINNEAPOLIS, MINNESOTA.

LOCK STEERING WHEEL.

Application filed April 27, 1923. Serial No. 634,993.

*To all whom it may concern:*

Be it known that we, THOMAS MORRISON and EDWARD CHALGREN, citizens of the United States, residing at Minneapolis, in the county of Hennepin and State of Minnesota, have invented certain new and useful Improvements in Lock Steering Wheels, of which the following is a specification.

Our invention relates to lock steering wheels for motor vehicles and the main object is to provide a simple, practical and efficient means for locking a steering wheel so that it cannot be used for steering the car, and thus preventing the vehicle from being stolen when left standing unoccupied by the owner, or lawful driver. A further object is to provide a locking means whereby a single turn of the lock key will permit the wheel to be spun and titled to any angle (when locked), thus not only rendering the wheel useless as such, but also allowing it to be tilted to any angle to better enable the driver to get in and out of his seat. Further objects will be described in the course of the following specification, and are illustrated in the structure shown in the accompanying drawing, in which:

Fig. 1 is an elevation of the upper end of a steering column, showing the application of our improved lock wheel.

Fig. 2 is an enlarged view, similar to Fig. 1, but showing the elements and parts, which embody our invention, in diametrical section.

Fig. 3 is a plan elevation of the ball 11 and lower socket member 25, shown partly broken away and in section, as seen substantially on the line 3—3 in Fig. 2.

Fig. 4 is a partly sectional view on the line 4—4 in Fig. 2.

Fig. 5 is a fragmentary section on the line 5—5 in Fig. 4.

The distinguishing features of the invention, and the important structural elements in the preferred embodiment, which is given as an example, will now be more particularly set forth, reference being had to the accompanying drawing, in which like parts will be designated by like characters in the various figures shown.

Our invention, with but very slight and immaterial modifications, may be applied and used on all makes of motor vehicles, but for purpose of illustration a well-known type of steering column is shown and consists of a post 6, having a knurled cap 7, a steering shaft 8, and a nut 9 adapted to secure the steering wheel onto the shaft 8, a key 10 ordinarily being used to make the wheel rigid with the shaft.

In the present instance the key 10 is used to prevent rotation of a steel ball 11, which is secured on the shaft 8 by the nut 9. The ball 11 has a diametrical opening, in the upper end of which is secured, by a key 12, a steel plug or lock cylinder 13, having a lock 14, all of which are made flush with the surface of the ball 11. An eccentric disk 15 is secured on the lower end of the lock 14, by screw 16, and guides in a notch 17 of a bolt 18, so as to actuate the bolt back and forth. A spring 19 tends to hold the bolt 18 out, by acting against its inner end. The outer end of the bolt being flush with the ball, when retracted or in locked position.

The web 20 of the steering wheel 21, has an integral hub or half-socket member 22, having a hardened steel lining 23, which engages against the ball 11, and which has a pocket 24 adapted to receive the bolt 18, when the latter is extended or unlocked.

A cup 25 screws into the hub 22, as at 26, and completes a socket with the hub, for the ball. After being screwed into place the cup is further secured by a pin 27, which is driven in and filed off flush so that it cannot be easily removed. The cup 25 is further provided with a segmental slot 28, which slidably engages over the hub 7ª of the cap 7. A guard 29 is placed over the cap 7, to prevent the latter from being removed.

When installing the device, the guard 29 and the cup 25 are first put in place. The ball 11 (with its inner elements removed) is then seated on the shaft 8. After the key 10 is inserted the nut 9 is secured, thus making the ball rigid with the shaft. The bolt 18 and its spring 19 are then inserted, after which the plug 13 is secured in place by the key 12. The bolt 18 is then withdrawn, the hub 22 is placed on the ball, and the cup 25 is screwed into place, after which the pin 27 is driven in and filed off flush with the cup.

When the bolt 18 is released, with its outer end in engagement with the pocket 24, all parts are rigid and the car may be steered. When the driver is to leave the car and desires to lock it against thieves, he inserts the key in the lock and by turning it causes the disk 15 to pull the bolt 18 back out of engagement with the wheel. When this is done the wheel is free to spin on the ball, and can also be tilted to any angle desired, by reason of the slot 28, thus enabling the driver to get into and out of his seat without being obstructed by the wheel. When the driver reenters the car he first brings the wheel into a right angular position with respect to the steering column. This enables him to insert the key in the lock and unlock or release the bolt 18. The wheel is then turned around until the bolt snaps into the pocket 24, after which the car may be properly steered and driven away.

The thief who tries to make way with the car meets with many difficulties, not found in most devices of this nature, which may be briefly set forth, as follows:

It may first be explained, that when a thief cannot successfully pick a lock, his next object is usually to so destroy or fix the device that some instrument can be applied to turn the steering shaft. This, however, is very difficult in the present instance. The guard 29 rotates freely on the cap 7, thus rendering it impossible to remove the cap and gain access to the shaft at that point. The next point of attack, the ball 11 which is rigid on the shaft 8 at all times, is also guarded against in the design of the device. To remove the wheel to gain access to the ball, the thief must first remove the pin 27 so that the hub 22 and the cup 25 may be screwed apart. In the event that by some means this pin may be removed, the wheel may be taken off, but the cup 25 cannot be so removed, as the ball prevents such displacement. The upper part of the ball is now the only rigid element that may be manipulated, and, as the bolt 18 and the lock plug 13 are flush with the ball, no instrument can be inserted, for gripping the ball, to turn it. Nor can a wrench or clamp be effectively applied, as the cup 25 is slightly more than half-spherical, thus leaving less than half of the hardened steel ball 11 projecting thereabove.

It is understood that suitable modification may be made in the general design and structural details of our invention, provided, that such modifications come within the spirit and scope of the appended claims. Having now, therefore, fully shown and described our invention, what we claim is:

1. The combination with a steering shaft of a motor vehicle, of a ball rigidly secured to the upper end of the shaft, a lock within the ball, a steering wheel having a hub socket engaged by said ball, and means operated by the lock for rigidly securing the wheel to the ball.

2. The combination with a steering shaft of a motor vehicle, of a ball rigidly secured to the upper end of the shaft, a lock within the ball, a steering wheel tiltably and rotatably mounted on the ball, and means operated by the lock for rigidly securing the wheel to the ball.

3. The combination with a steering shaft of a motor vehicle, of a ball rigidly secured to the upper end of the shaft, a wheel universally mounted on the ball, a lock actuated bolt slidably mounted in the ball for engagement with the wheel.

4. The combination with a steering shaft of a motor vehicle, of a ball rigidly secured to the upper end of the shaft, a wheel universally mounted on the ball, a lock actuated bolt slidably mounted in the ball for engagement with the wheel, the wheel engaging end of said bolt being flush with the surface of the ball when the bolt is retracted.

5. In a device of the character described, a ball rigidly secured on a steering shaft, a steering wheel having a centrally arranged socket inclosing said ball, a bolt slidably mounted on the ball with one end normally spring held outward in engagement with the wheel, a lock in the ball adapted to retract the bolt, the end surface of said bolt being flush with the surface of the ball, when retracted.

In testimony whereof we affix our signatures.

THOMAS MORRISON.
EDWARD CHALGREN.